(12) United States Patent
Nenoff et al.

(10) Patent No.: US 6,494,326 B1
(45) Date of Patent: Dec. 17, 2002

(54) COMPOSITE ZEOLITE MEMBRANES

(75) Inventors: Tina M. Nenoff, Albuquerque, NM (US); Steven G. Thoma, Albuquerque, NM (US); Carol S. Ashley, Albuquerque, NM (US); Scott T. Reed, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 111 days.

(21) Appl. No.: 09/596,205

(22) Filed: Jun. 15, 2000

(51) Int. Cl.$^7$ ............................................. B01D 71/02
(52) U.S. Cl. ...................... 210/483; 210/488; 210/489; 210/490; 210/500.26; 210/503; 210/504; 210/506; 210/510.1

(58) Field of Search .................................. 210/483, 488, 210/489, 490, 500.26, 502.1, 503, 504, 506, 510.1; 502/400, 405, 407, 415

(56) References Cited

U.S. PATENT DOCUMENTS

| | | | | |
|---|---|---|---|---|
| 5,716,527 A | * | 2/1998 | Deckman et al. | 210/651 |
| 5,723,397 A | * | 3/1998 | Verduijn | 502/4 |
| 5,849,215 A | * | 12/1998 | Gin et al. | 252/299.01 |
| 5,871,650 A | * | 2/1999 | Lai et al. | 210/653 |
| 5,968,366 A | * | 10/1999 | Deckman et al. | 210/651 |

* cited by examiner

Primary Examiner—John Kim
(74) Attorney, Agent, or Firm—Brian W. Dodson

(57) ABSTRACT

A new class of composite zeolite membranes and synthesis techniques therefor has been invented. These membranes are essentially defect-free, and exhibit large levels of transmembrane flux and of chemical and isotopic selectivity.

13 Claims, 2 Drawing Sheets

COMPOSITE ZEOLITE MEMBRANES

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to membranes containing molecular sieves, and to new techniques for fabrication thereof.

BACKGROUND OF THE INVENTION

Molecular sieves are nanoporous solids which possess small (typically <10 Å) pores which are intrinsic to their molecular structure. These pores can be used to selectively control rates of diffusion of various chemicals through a molecular sieve. Selectivity can be induced and controlled through the size and shape of the pore (i.e., simple "key-in-lock" steric hindrance effects), and/or by including moieties which interact with the chemicals involved in manners which add to the selectivity of the pore. Such materials are used routinely in bulk form for separation of different gases, and for dehydration of a working atmosphere. They also have potential large-scale commercial applications in, e.g., high-temperature separation and selection of intermediate reaction products.

A particularly important subclass of molecular sieves are the zeolites. Zeolites are nanoporous inorganic aluminosilicates with pore diameters typically in the 3–7 Å range.

The crystalline nature of zeolites means that the pores are well defined in size, without variation—an intrinsic property of the crystal structure. That is, if a crystallographically oriented layer of zeolite crystals is grown, the pores thereof will share a common orientation relative to the growth surface. An orientation of particular interest is one in which the pores provide direct (if not exactly normal) paths through such a layer.

Zeolites are archetypal molecular sieves, partially because they are available with a wide range of pore diameters, and partially because they can be found naturally as a component of certain clays. Statements and claims made concerning zeolites generally apply to a broader range of molecular sieves.

However, the use of bulk zeolites is neither efficient nor effective for most chemical separation procedures. As the material is bulk, separation occurs because the difference in diffusion rates through the nanopores of the zeolite causes a large amount of one of the chemicals being separated to become temporarily trapped in the zeolite pores. This restricts one to use of batch or semi-batch separation processes, which are generally not compatible with a properly functioning continuous flow synthesis process, as is usually desirable for very large scale synthesis.

An example of the areas in which such membranes are potentially useful, if the fabrication limitations can be overcome, lies in the area of large-scale organic synthesis. A common situation is where an intermediate step in the synthetic process produces a variety of isomers, only one of which can be used as feedstock for the next step in the synthesis. This situation is often met by taking the typically high-temperature (perhaps 300–500 C.) intermediate product mixture, cooling it to liquid nitrogen temperatures, and then separating the isomers using fractional distillation, a slow and expensive technique. The desired isomer is then heated back to the processing temperature, and the synthetic process proceeds.

The cost of this separation step in energy alone is several tens of millions of dollars per year for a single plant, and the need for the additional apparatus to support the cooling, distillation, and reheating steps can represent a significant portion of the capital cost of the synthesis plant. Clearly there is a need for a substitute process with increased energy efficiency and lower capital cost. Thin film zeolite membranes could fill this role, if suitably defect-free and robust membranes could be fabricated.

One approach toward relieving the processing constraints involved with use of bulk zeolites for separation is to somehow make membranes which comprise zeolites, in which the zeolites can still function effectively as separators (i.e., active zeolites). Although it is in principle possible to create nanoporous materials from source materials which are not naturally porous (e.g., porous silicon, or acid-etched alloy sheets), present fabrication techniques therefor usually do not provide product with adequate selectivity for most practical applications.

Traditional approaches toward synthesis of thin film membranes comprising zeolites generally fall into three main classes. Self-supporting membranes can be made, essentially using sintering techniques. However, such membranes are not durable, and are difficult to adhere to a supportive substrate. Alternately, it is possible to grow single crystal zeolite films on suitable substrates. Unfortunately, such films are highly defective when made in sizes suitable for industrial applications.

The most intensively pursued approach toward fabricating thin film membranes which comprise active zeolites is to grow defective zeolite films (usually polycrystalline in structure), and attempt to fill in the defects using secondary growth of zeolites atop the original layer, or by depositing carbonaceous material in the defects. The result to date has been thick films with blocked flow channels leading to poor penetration flow rates, which have limited thermal stability and problems in adhering to suitable substrates.

Specific attempts to make satisfactory zeolite membranes deserve some description, as such point out the intractable practical problems which have appeared in past work. The publications discussed below are included in the Information Disclosure Statement for the instant application.

The zeolite most studied in the quest for robust selective membranes is ZSM5, which is an orthorhombic crystal type. The chemical formula is $Na_n[Al_nSi_{96-n}O_{192}]$ with about 16 $H_2O$ of hydration, and n<27. The pores are aligned along the [010] and [100] crystallographic directions, and have sizes just over 5 Å. The equivalent material with n=0 is sometimes called silicalite.

Chiou et al. (Journal of Materials Science Letters 15, 952–954 (1996)) describe a technique to fabricate continuous zeolite films and membranes. Continuous ZSM-5 films were hydrothermally grown on anodic alumina substrates. The hydrothermal crystal growth process is commonly used in this area of endeavor. The technique used by Chiou et al. is a typical one, although the results of such growth can depend strongly on the growth parameters chosen.

Chiou et al. carry out hydrothermal growth of ZSM-5 by forming a growth solution of tetraethylorthosilicate (TEOS), sodium hydroxide, tetrapropylammonium bromide (TPABr), and de-ionized water so as to obtain the molar ratios $5Na_2O:10TPABr:100SiO_2:10000H_2O$. This growth solution and an anodic alumina substrate were sealed in a teflon-coated stainless-steel autoclave. Film growth was then induced by heating the autoclave to 180–200 C. for 1–4 days under autogenous pressure without stirring. The samples were then cooled, washed, and dried.

The result found by Chiou et al. was growth of a thick (about 30 microns) and nominally continuous layer of randomly oriented ZSM-5 crystallites. The lack of crystallite orientation and the extreme thickness makes such a layer inappropriate for use in chemical separation. The arrangement of crystallites makes it likely that large numbers of large pores, cracks, and other interstitial defects exist in these films—again destroying any potential for significant chemical selectivity in these materials.

C. Bai et al. (Journal of Materials Science 105, 79–87 (1995)) reported growth of chemically selective silicalite membranes on γ-alumina substrates. The layers, with thicknesses of about 5 microns, were grown from a gel on the surface of a tube.

The gel used in the growth process was prepared as follows. 0.95 grams of NaOH, 2.1 grams of TPABr, and 10 grams of finely divided silica were dissolved in 125 grams of distilled water. This solution was then mixed thoroughly and allowed to age for a day before being transferred to and sealed within a γ-alumina tube. The tube was placed in an autoclave, and heated to 180 C. under autogenous pressure for 12 hours. Repeated film growth steps were required to produce a nonpermeable membrane—that is, one in which permeability appears only because of the pores, and not because of micro and macro defects.

As grown, the membrane pores were blocked by TPABr molecules. To remove these, the membrane was calcined in air. A very slow temperature ramp (about 0.1 C./minute) up to a temperature over 450 C. was required so that the calcining process did not crack the membrane. Significant, although not dramatic, levels of both physical and chemical selectivity were displayed by these membranes. However, the requirement for multiple growth steps, and the observed tendency to crack easily on changes in temperature, suggest that these membranes are unlikely to withstand the rigours of a commercial synthesis plant.

Lovallo and Tsapatsis (American Institute of Chemical Engineering Journal 42, 3020–3028 (1996)) report on their fabrication of a preferentially oriented submicron silicalite membrane. They deposited a precursor layer of zeolite nanocrystals, then used these nanocrystals as growth nuclei in more conventional hydrothermal growth.

A solution of silicalite nanocrystallites (about 1000 Å in size) were made by aging a standard growth solution as described above. Precursor films are then grown from a mixture of the above solution and a solution of alumina nanocrystallites. The resulting films were dried at 110 C., and calcined at between 550 C. and 750 C. for several hours. The resulting precursor films are polycrystalline and randomly oriented.

Secondary growth of the crystallites in this precursor film in a conventional hydrothermal growth environment results, under the published conditions, in preferential growth of platelike crystallites which grow together to form a continuous and intergrown layer. The crystallites making up this final layer are preferentially oriented. Unfortunately, both types are oriented parallel to the membrane surface, rather than the desired perpendicular orientation.

The above described efforts toward fabricating a zeolite membrane have concentrated on producing a continuous zeolite membrane by multiple zeolite growth cycles. Either hydrothermal growth or a combination of hydrothermal and sol-gel growth processes were used, but the material being grown has always been the desired zeolite.

Y. Yan et al. (Journal of Membrane Science 123, 95–103 (1997)) have investigated the possibility of "caulking" cracks and other micro defects in a polycrystalline zeolite layer with carbonaceous deposits. They refer to this procedure as "coking". A ZSM-5 membrane is grown much as described earlier, with an additional step of applying a diffusion barrier to the substrate surface so that the hydrothermal growth solution cannot penetrate into the substrate, thereby preventing formation of a layer which is too thick. Following growth, a large aromatic hydrocarbon is applied to the membrane. This hydrocarbon is too large to enter the ZSM-5 pores, but small enough that all microdefects in the membrane layer should be filled. At this point, the hydrocarbon is carbonized by exposing the membrane to temperatures of about 500 C. It does appear that this procedure is successful at closing many microdefects. However, there is also a large decrease of permeability through the zeolite pores, suggesting that this approach also closes such pores, despite the inability of the hydrocarbon to penetrate said pores. When this difficulty is combined with the probable lack of thermal cycling stability induced by differential thermal expansion between the coke and the zeolite membrane, it appears unlikely that this approach will routinely result in commercially useful membranes.

The present invention enables fabrication of suitable thin-film zeolite membranes by a combination of growth of zeolite crystallizes on a substrate followed by embedding said crystallites in a densified sol-gel product layer. The result is a robust, thermally stable, and highly selective membrane suitable for many chemical synthetic process steps.

SUMMARY OF THE INVENTION

The invention is of a new class of composite zeolite membranes and techniques for their fabrication. These membranes have a layer of zeolite crystallites on top of a porous substrate. The cracks and voids between the zeolite crystallites, which essentially eliminate the chemical selectivity which can be exhibited by zeolite nanopores, are filled in by a densified sol-gel product deposited by a sol-gel technique. The result is a rugged, highly selective membrane with good throughput.

DETAILED DESCRIPTION

Figure 1:
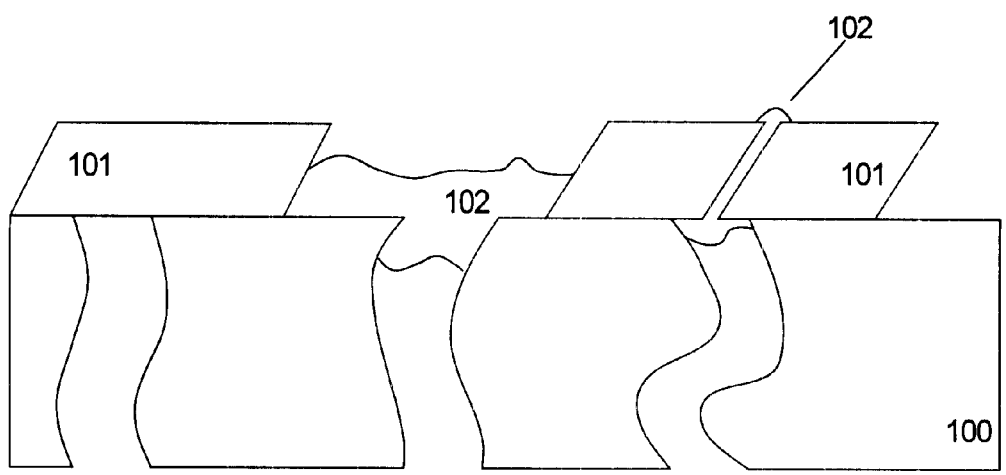
FIG. 1. A schematic illustration of the structure of a composite zeolite membrane after the instant invention.

The instant invention is of a composite zeolite/sol-gel membrane suitable for chemical and isomeric separation, and synthesis methods therefor. To achieve this sort of separation ability requires that the rate-limiting transport mode through the membrane be transport through the zeolite pores, and not through membrane defects.

Note that when the separation structures are identified as zeolites, most nanoporous materials can be used in this application.

A direct attempt to grow a zeolite membrane which is sufficiently thin and (preferably) has either nonoriented or oriented zeolite pores, but which is also essentially free from macrodefects (e.g., cracks and holes) and microdefects (e.g., unfilled chinks between crystallites) has not proven effective.

Previous attempts to grow zeolite-bearing membranes suitable for separation have used a number of synthetic approaches. Here direct hydrothermal growth is based on a growth solution which reacts to form zeolite crystallites at the point of growth, while the hydrothermal addition of zeolite nanocrystallites is based on a growth solution which has previously been aged to form a suspension of zeolite nanocrystallites, which are then deposited on the substrate under hydrothermal growth conditions. Some of the previous synthetic methods include:

- Direct hydrothermal growth of a very thick zeolite membrane
- Multiple cycles of hydrothermal addition of zeolite nanocrystallites
- Deposition of a layer of zeolite nanocrystallites, followed by direct hydrothermal regrowth of the zeolite nanocrystallites
- Direct hydrothermal growth of a thin, defective zeolite membrane followed by hydrothermal addition of zeolite nanocrystallites
- Direct hydrothermal growth of a thin, defective zeolite membrane followed by "coking" to try to fill residual defects.

The membranes resulting from these techniques have all failed of attaining any practical application for one or more of the following reasons:

- Microdefects and/or macrodefects remain in sufficient number that membrane transport is dominated by defect transport, rather than by the chemically selective transport through zeolite pores
- A large proportion of the zeolite pores are clogged by some extrinsic material, thereby severely limiting the transmembrane flux
- The zeolite crystallites are so oriented that the zeolite pores are oriented parallel to the membrane surface
- The exhibited degree of chemical selectivity is insufficient for practical synthetic applications
- The final membrane is overly sensitive to thermal shock, or is otherwise overly fragile for chemical synthesis production facilities The process of the instant invention produces a zeolite-bearing membrane which is substantially defect-free, is physically and thermally robust, has large transmembrane flux, has a high level of chemical selectivity, and can be produced with zeolite crystallites either randomly oriented, or oriented with the zeolite pores perpendicular to the membrane surface. These membranes have proven highly effective at chemical and isomeric separation, and have the combination of properties which makes them suitable for large-scale chemical processing.

A composite zeolite membrane according to the instant invention has a structure similar to that indicated schematically in FIG. 1. These membranes are grown on a porous support 100, and are composites of materials comprising zeolite crystallites 101 and a suitable densified sol-gel product 102. Densified sol-gel product 102 fills micro and macrodefects in the zeolite crystallite layer, and penetrates into the porous support 100, without significantly clogging zeolite pores.

Densified sol-gel product 102 is chosen to have excellent adhesion to the zeolite crystallites, and similar thermal expansion properties, unlike the carbon deposits attempted by Yan et al. Note that densified sol-gel product 102 typically is deposited in multiple steps, and hence may exhibit a layered structure with layers having slightly differing properties. Also, densified sol-gel product 102 must not form a thick, continuous layer on top of the zeolite crystallites, or the resulting membrane will be thoroughly clogged.

The method to make composite zeolite membranes according to the instant invention can be summarized as follows. An aged zeolite hydrothermal growth solution is made, and applied to the surface of a porous support. The aged growth solution comprises zeolite nanocrystallites. The porous support is typically (but not necessarily) made of alumina, zirconia, or other refractory ceramics.

The coated support is then exposed to hydrothermal growth conditions, during which a layer of zeolite crystallites is formed on the surface of the support. The zeolite crystallites, which can be grown as oriented with ores perpendicular to the support surface or as randomly oriented, can vary in density from isolated crystallites to nearly defect-free continuous layers of merged zeolite crystallites.

Subsequently, at least one, but typically multiple, layers of densified sol-gel product are deposited using a sol-gel technique. The sol growth solution is aged to produce an appropriate mean densified sol-gel product nanocrystallite size. Then the viscosity and nanocrystallite concentration of the solution is adjusted, and is coated onto the zeolite layer. Application methods include dip-coating, spincoating, and other coating techniques.

The solution permeates the defects and spaces between the zeolite crystallites, and then penetrates into the porous support. This penetration prevents overcoating the zeolite crystallites to the extent that transport through the membrane is inhibited, provided that the viscosity, concentration, and thickness of the solution layer is chosen properly.

Following application of a solution coating (or possibly following multiple such coatings), a heating step is applied to densify the sol, converting it into a continuous layer of densified sol-gel product. A number of such coating steps may be required to produce the desired defect-free composite membrane.

The above summary process is provided for expository purposes. Numerous variations on this summary process exist, and the scope of the instant invention is not intended to be established solely on the above description.

A particular implementation of the process to synthesize composite zeolite membranes according to the instant invention will now be described. Again, many variations on this implementation exist, and this description is not intended to limit the scope of the instant invention.

Two aged growth solutions are needed to begin with, one for the zeolite layer, and one for the sol-gel densified sol-gel product deposition. These are made as follows:

I. ZSM-5 zeolite growth solution
- Dissolve 0.0877 grams of $NaAlO_2$ in 40 ml of water
- Make a first solution of 4 grams of the above $NaAlO_2$ solution, 1 gram of 1 molar tetrapropylammonium hydroxide (TPAOH) solution, and 0.24 grams of a 50% by weight NaOH solution in water.
- Make a second solution of 1.26 grams of fumed silica and 12.58 grams of water. (Fumed silica is primarily composed of silica nanocrystallites.)
- Add the first solution slowly to the second solution
- Adjust the pH of the mixture to 11.1
- Age the resulting growth solution for 3 days at ambient conditions.

II. Densified sol-gel product growth solution
- Make a ,tetraorthosilicate (TEOS) solution by mixing 61 ml TEOS, 61 ml ethanol, 0.2 ml 1.0 molar hydrochloric acid, and 4.9 ml water. Let the TEOS solution stand at 50° C. for 48 hours.

Make the densified sol-gel product growth solution by adding 1.6 ml of 1.0 molar hydrochloric acid to 10 ml of the aged TEOS solution.

Age the densified sol-gel product growth solution for 1.5 hours at 60° C.

The synthesis technique being described will produce a composite zeolite membrane on the inside of a porous alumina tube, this being a particularly useful configuration for applications in chemical separation and synthesis. Other configurations, such as flat membranes, can also be produced using variations of the techniques being described.

Continue the synthetic process by further aging the zeolite growth solution for 19 hours at 40° C., then for 6 hours at room temperature. Dilute the zeolite growth solution with an equal volume of water, and place it within a capped porous alumina tube whose outside surface is sealed with Teflon tape. The alumina tube will typically have pores smaller than about 100 Å. The quantity of diluted zeolite growth solution to be placed in the tube depends primarily on the dimensions of the tube and the characteristics of the zeolite layer to be grown. The open end of the tube is then capped and also sealed with Teflon tape.

The porous alumina tube is then placed in a Parr reactor vessel, and is held at 150° C. for 17.5 hours. (These are typical hydrothermal growth conditions.) If the reactor is held stationary during growth of the zeolite layer, the crystallites will be randomly oriented. If the reactor is rotated at 80 rpm during the growth process, the crystallites will be oriented with the zeolite pores perpendicular to the inner surface of the alumina tube. Both of these are favorable configurations for high transmembrane flux membranes.

Following the above zeolite deposition step, the zeolite crystallites are calcined at temperatures above 300° C. to remove their organic constituent, and any residual organic contamination. In some cases this calcining step can be left out, and removal of residual organics carried out during the densified sol-gel product densification steps to follow.

At this point various additives can be ion exchanged into the zeolite crystallites to adjust the chemical selectivity of the final membrane. For example, the zeolite crystallites can be protinated by placing them in 0.1 molar hydrochloric acid at 50° C. for 24 hours, followed by 24 hours in deionized water. Such ion exchange techniques are well-known in the art.

Next, a coating of the densified sol-gel product growth solution must be applied to the inside of the alumina tube. The densified sol-gel product growth solution is diluted, in a ratio ranging typically from 1:2 to 1:20, with water, ethanol, and/or tetrahydrofuran. The aim is to appropriately adjust the growth solution viscosity, and the density of the densified sol-gel product nanocrystallites in that solution. The alumina tube is then coated by dipping into the densified sol-gel product growth solution, and withdrawing the tube at a rate typically between 1 and 10 inches per minute. This rate, combined with the viscosity of the growth solution, determines the thickness of the growth solution coating.

Following coating the alumina tube with growth solution, the growth solution permeates residual defects in the zeolite crystallite layer and can intrude into the pores of the alumina tube. (Not enough material is supplied to seal the pores in the alumina tube, however.) The densified sol-gel product growth solution is then calcined, by exposing the alumina tube to temperatures of 500° C. in air for several hours. Heating rates from 1 to 10° C. per minute have been safely used for the calcining process.

The number of densified sol-gel product growth steps which must be carried out to seal the defects and complete the composite membrane will depend on many factors, including the surface density and height of the zeolite crystallites, the densified sol-gel product growth viscosities which can be applied without overcoating the zeolite crystallites, the concentration and size of densified sol-gel product nanocrystallites in the growth solution, and so on. These variations in technique are relatively straightforward, and at least qualitatively predictable. As a result, good results can be expected with a minimum of routine experimentation.

Figure 2:
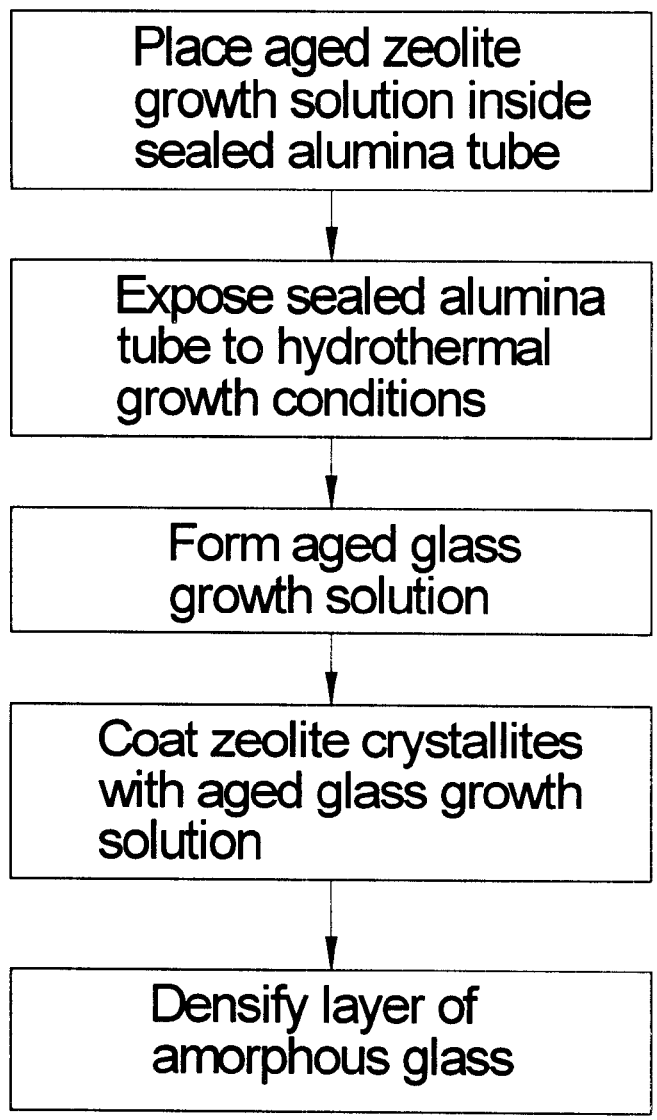
FIG. 2. A simplified flow chart of a specific synthetic route for the new composite zeolite membranes.

The above growth technique for composite zeolite membranes is summarized in FIG. 2.

Numerous variations oh the above implementation of the instant invention produce the desired end product. The scope of the invention is not intended to be limited by any specific example or implementation, but only by the claims interpreted in view of the specification.

What is claimed is:

1. A composite molecular sieve membrane, comprising:
   a) a layer of molecular sieve crystallites, said crystallites comprising a plurality of nanopores, and said layer comprising penetrating voids; and,
   b) a layer of densified sol-gel product so disposed on the layer of molecular sieve crystallites as to seal said penetrating voids while allowing transmembrane transport through the plurality of nanopores.

2. The composite membrane of claim 1, wherein the plurality of nanopores within the molecular sieve crystallites are oriented perpendicular to the membrane surface.

3. The composite membrane of claim 1, further comprising a substrate with a surface on which are located said layer of molecular sieve crystallites and said layer of densified sol-gel product.

4. The composite membrane of claim 3, wherein said substrate is porous.

5. The composite membrane of claim 3, wherein the pores of said substrate have diameter smaller than 100 Å.

6. The composite membrane of claim 3, wherein said substrate is a porous ceramic.

7. The composite membrane of claim 3, wherein said substrate consists essentially of alumina.

8. The composite membrane of claim 1, wherein said molecular sieve crystallites comprise zeolite crystallites.

9. The composite membrane of claim 1, wherein said molecular sieve crystallites consist primarily of zeolite crystallites.

10. The composite membrane of claim 1, wherein the layer of densified sol-gel product has a composition substantially that of $SiO_2$, $Al_2O_3$, or combinations thereof.

11. The composite membrane of claim 8, wherein the composition of said zeolite crystallites is an aluminosilicate with an aluminum to silicon ratio between zero and 1:50.

12. The composite membrane of claim 11 wherein said aluminosilicate further comprises metal dopant atoms, said metal dopant atoms being chosen from metallic atoms in periodic table Groups 4 through 13.

13. The composite membrane of claim 11 wherein said zeolite crystallites have been protinated.

* * * * *